(No Model.) 2 Sheets—Sheet 2.
C. ABRESCH.
DUMPING WAGON.
No. 478,834. Patented July 12, 1892.
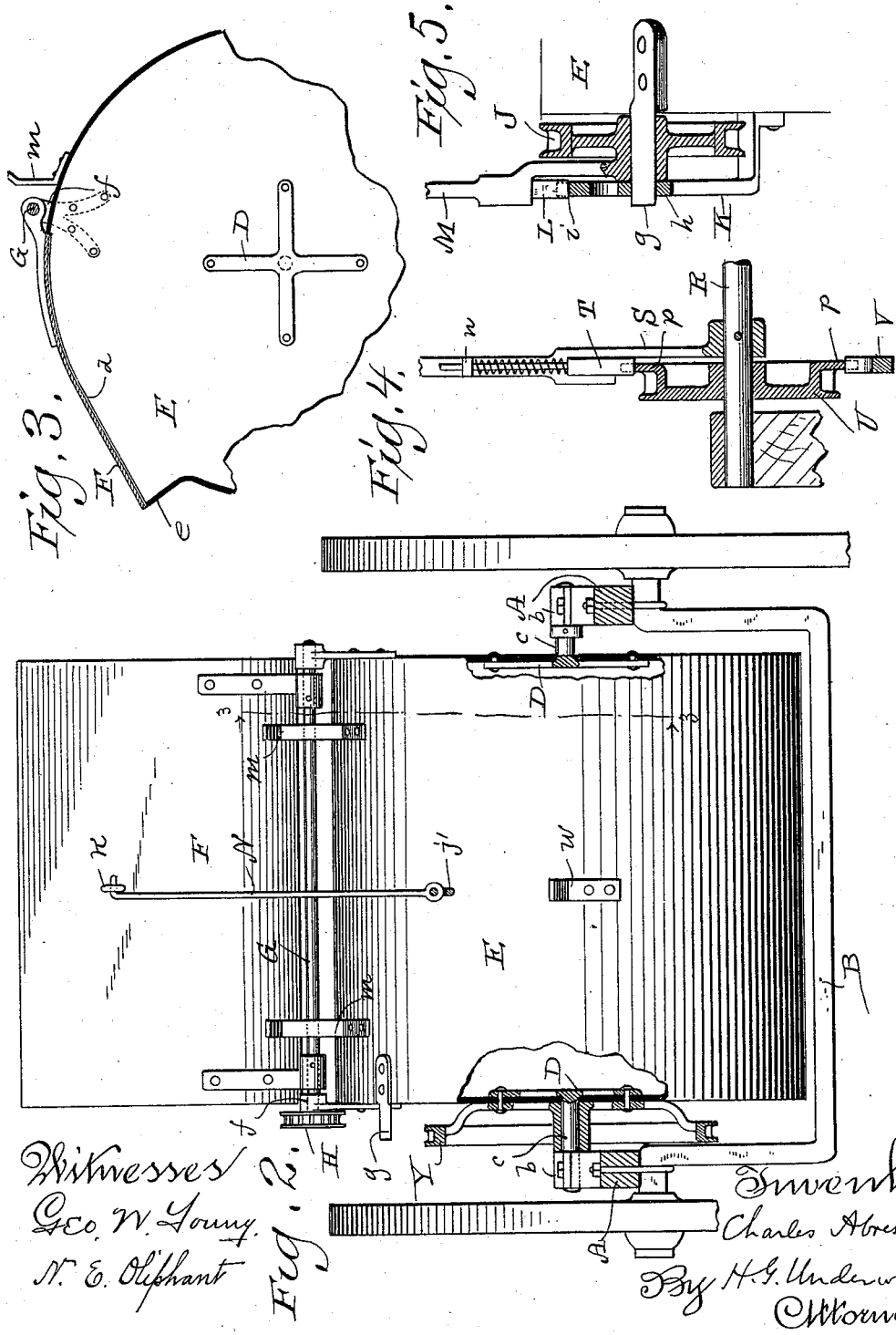
Witnesses
Geo. W. Young.
N. E. Oliphant
Inventor
Charles Abresch.
By H. G. Underwood,
Attorney
THE NORRIS PETERS CO., PHOTO-LITHO., WASHINGTON, D. C.

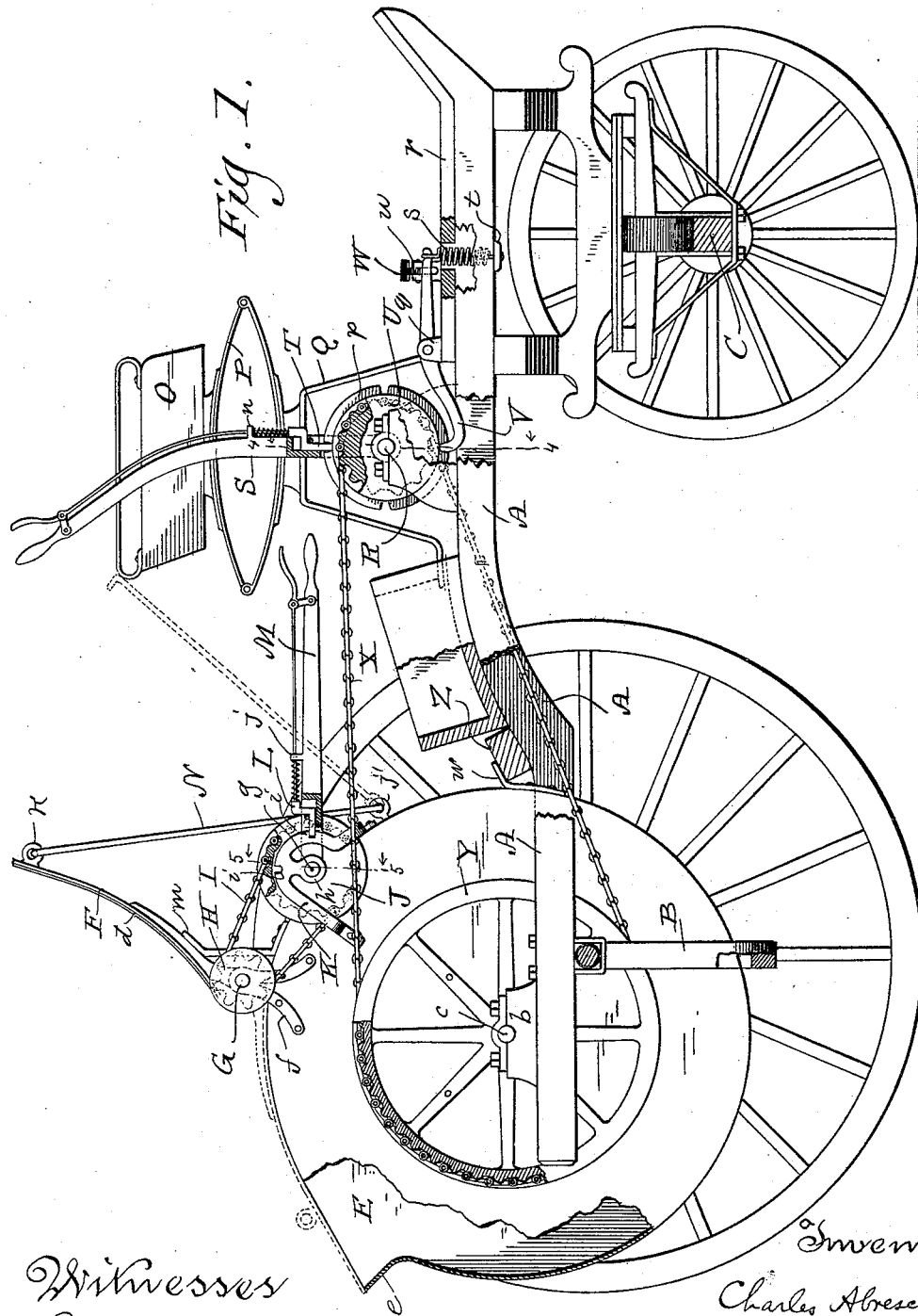

UNITED STATES PATENT OFFICE.

CHARLES ABRESCH, OF MILWAUKEE, WISCONSIN.

DUMPING-WAGON.

SPECIFICATION forming part of Letters Patent No. 478,834, dated July 12, 1892.

Application filed March 14, 1892. Serial No. 424,823. (No model.)

*To all whom it may concern:*

Be it known that I, CHARLES ABRESCH, a citizen of the United States, and a resident of Milwaukee, in the county of Milwaukee, and in the State of Wisconsin, have invented certain new and useful Improvements in Dumping-Wagons; and I do hereby declare that the following is a full, clear, and exact description thereof.

My invention has for its object to provide a simple light-draft wagon for the transportation of garbage or other offensive matter in which a dumping-tank and its hinged closure may be operated by the driver while mounted upon the wagon-seat.

To this end the said invention consists in certain peculiarities of construction and combination of parts, to be hereinafter described with reference to the accompanying drawings, and subsequently claimed.

In the drawings, Figure 1 represents a side elevation of a wagon constructed according to my invention with certain of the parts in section and broken away for the purpose of better illustration; Fig. 2, a detail elevation looking toward the rear with certain of the parts in section and broken away; Fig. 3, a detail sectional view taken on line 3 3 of the preceding figure, and Figs. 4 and 5 similar views respectively taken on lines 4 4 and 5 5 of Fig. 1.

Referring by letter to the drawings, A A represent parallel side sills that are preferably shaped so as to have their forward portions on a plane above the rear portions thereof, as clearly illustrated in Fig. 1, and these sills are mounted upon a running-gear of ordinary construction. The rear axle B of the running-gear is bent down between the wheels thereon to clear a dumping-tank hereinafter described, and the forward axle C has a fifth-wheel connection with the sills A A, the wheels on this latter axle being of such diameter as to clear the adjacent forward portions of said sills when the lower section of the fifth-wheel is turned on its axis. Adjacent to their rear ends the sills A A are provided with bearings *b* for trunnions *c*, that extend from spiders D, riveted or otherwise rigidly secured upon the interior of a tank E, the latter being of circular form and provided with an opening of suitable dimensions that is normally closed by a door F. In order to prevent the escape of odors and gases from the tank, the door F is faced with a packing *d*, of rubber or other suitable material, arranged to overlap the edges of the tank-opening when said door is closed.

As shown in Fig. 1, the tank-opening has its delivery edge *e* at a tangent to the circular contour of the tank, and thus I insure of a complete discharge of the contents of said tank when the latter is dumped.

The door F is fast on a transverse shaft G, and this shaft is arranged to turn in bearings *f* on the tank. Fast on one end of the shaft G is a sprocket-wheel H, connected by a link belt I with a similar wheel J, that turns on a stud *g*, extended laterally from said tank, as best illustrated in Figs. 2 and 5. Fast to the tank is a segmental bracket K, provided with a support *h* for the stud *g*, and notches *i* for engagement with a spring-controlled latch-rod L, arranged in guides *j* on a lever M, that is rigid with the sprocket-wheel J, above described, this latter construction being illustrated in detail by Fig. 5.

By actuating the lever M motion is imparted to the sprocket-wheel and link-belt mechanism above described, whereby the shaft G is turned in its bearings *f* to open or close the door F of the tank, and if this door be opened, as shown in the drawings, a hook-rod N, connected to an eye *j'* on the tank, is engaged with another eye *k* on said door, in order to prevent strain upon said sprocket-wheel and link-belt mechanism, the hook-rod being preferably of such length as to require forcible insertion in the eye on the tank-door. When not in use, the hook-rod lies against the back of the wagon-seat O, as shown in dotted lines, and the handle portion of the lever M is also within easy reach of a driver mounted on said seat.

Stops *m* are arranged on the tank to limit the movement of the door F when the latter is raised, and thereby prevent said door from coming too far over toward the driver of the wagon prior to the engagement of the lever-latch with the lower one of the notches *i* in the bracket K, as shown in Fig. 1, and by reference to this figure of the drawings it will be seen that the aforesaid door may be opened or closed by a quarter-turn of the lever-actuated sprocket-wheel.

As shown, the wagon-seat O is mounted on springs P, supported upon suitable standards Q, and the sills A are provided with bearings for a shaft R, to which a lever S, that comes within easy reach of the driver, is made fast, and this lever has guides $n$ thereon for a spring-controlled latch-rod T, designed for engagement with a circular rack in the form of a notched flange $p$ on a sprocket-wheel U, that is loose on said shaft.

Pivotally connected to a bracket $q$ on the foot-bed $r$, at the front of the wagon, is a detent V for engagement with the notched flange of the sprocket-wheel U, and this detent is connected at its forward end to a spring $s$, that is made fast to a bracket $t$ on the adjacent one of the sills A, said spring being normally expanded to thereby exert power upon said detent and hold the latter in engagement with said sprocket-wheel flange.

Impinged against the detent V, in opposition to the contracting power of the spring $s$, is a lever W, fulcrumed to a bracket $u$ on the foot-bed $r$ of the wagon, and this latter lever is actuated by the driver's foot to bring said detent out of engagement with the flange of the sprocket-wheel when it is desirable to actuate the latter. The sprocket-wheel U is connected by a link-belt X with a similar wheel Y, fast on one of the trunnions of the tank E, and as the lever S comes within easy reach of the driver said tank may be readily turned to dump its contents without the necessity of said driver dismounting. As shown, the flange on the sprocket-wheel is provided with four notches equidistant apart, and said wheel is consequently given a quarter-turn at each throw of the lever S when the latch-rod T of the latter is in engagement with said flange and the detent V held out of engagement with the same. As there is a preponderance of weight on the upper forward portion of the tank, I provide the latter with an ear $w$, that comes against a transverse beam Z when said tank is brought to its normal position, as shown in Fig. 1, the transverse beam being joined at its ends to the sills A, above described. The beam Z not only acts as a stop to limit the return movement of the tank after dumping, but it also serves to partially support the weight of the same.

In front of the tank E a box of suitable dimensions is made fast to the sills A, and this box serves as a receptacle for various utensils employed in connection with the herein-described wagon.

Having now fully described my invention, what I claim as new, and desire to secure by Letters Patent, is—

1. A wagon in which a tank is trunnioned to a pair of sills, a sprocket-wheel fast to one of the tank-trunnions and connected by a link belt with another sprocket-wheel loose on a lever-controlled shaft, a latch-rod on the shaft-lever arranged to engage a circular rack rigid with the latter sprocket-wheel, and a detent that is also arranged to engage the rack, substantially as set forth.

2. A wagon in which a tank is trunnioned to a pair of sills, a sprocket-wheel fast on one of the tank-trunnions and connected by a link belt with another sprocket-wheel loose on a lever-controlled shaft, a latch-rod on the shaft-lever arranged to engage a circular rack rigid with the latter sprocket-wheel, and a spring-and-lever controlled detent that is also arranged to engage the rack, substantially as set forth.

3. A wagon in which a dumping-tank is provided with bearings for a shaft, a closure for the tank made fast to the shaft, a sprocket-wheel fast on said shaft and connected by a link belt with a similar wheel loose on a stud that extends laterally from said tank, a lever rigid with the latter sprocket-wheel, a latch-rod on the lever, and a notched bracket arranged to engage the latch-rod, substantially as set forth.

4. A wagon in which a dumping-tank is provided with bearings for a shaft, a closure for the tank made fast to the shaft, a sprocket-wheel also fast on said shaft and connected by a link belt with a similar wheel loose on a stud laterally extended from said tank, a lever rigid with the latter sprocket-wheel, a latch-rod on the lever, a notched bracket for engagement with the latch-rod, and a stay-rod arranged to detachably connect the aforesaid tank and closure when the latter is in its raised position, substantially as set forth.

In testimony that I claim the foregoing I have hereunto set my hand, at Milwaukee, in the county of Milwaukee and State of Wisconsin, in the presence of two witnesses.

CHARLES ABRESCH.

Witnesses:
N. E. OLIPHANT,
JOHN E. WILES.